United States Patent Office 3,305,516
Patented Feb. 21, 1967

3,305,516
SYNTHETIC RUBBER COMPOSITIONS AND PNEUMATIC TIRE TREADS PREPARED THEREFROM
Owen E. Smith, Akron, Ohio, assignor to The Goodyear Tire & Rubber Company, Akron, Ohio, a corporation of Ohio
No Drawing. Filed Oct. 15, 1965, Ser. No. 496,672
5 Claims. (Cl. 260—33.6)

This application is a continuation-in-part of application Serial No. 415,494, filed December 2, 1964, and now abandoned.

This invention relates to improved synthetic rubber compositions that are particularly useful in the construction of treads for pneumatic tires. More particularly the invention is concerned with synthetic rubber compositions comprising a blend of a rubbery copolymer of butadiene-1,3 and acrylonitrile, an oil extended rubbery copolymer of butadiene-1,3 and styrene and a rubbery polymer of 1,4 polybutadiene.

The stereospecific spatially oriented polymers and in particular cis-1,4 polybutadiene have many desirable characteristics and it has been known that blends of an oil extended rubbery copolymer of butadiene-1,3 and styrene (OE-SBR) with a substantial proportion of a stereospecific spatially oriented cis-1,4 polybutadiene (PBD) rubber will produce a rubber composition displaying many characteristics that are desirable in the treads of pneumatic tires. However, such rubber compositions composed of a blend of OE-SBR and PBD rubber have been found to display a very low coefficient of friction, particularly on wet asphalt and wet cement surfaces. Regardless of the many other favorable characteristics of such rubber blends the unsatisfactory performance of these rubber blends in their traction qualities has prevented such blends from being fully utilized in the commercial production of tire treads.

It is therefore the principal object of this invention to provide a new and improved synthetic rubber composition. It is a further object of this invention to provide an improved rubber composition that has a high coefficient of friction with paved surfaces and is particularly adaptable for employment in the tread of pneumatic tires.

In accordance with the present invention the foregoing and other objects are accomplished by preparing rubber compositions having the following proportions:

A. From 10 to 30 parts by weight of a rubbery copolymer of butadiene-1,3 and acrylonitrile.

B. From 20 to 50 parts by weight of a rubbery copolymer of butadiene-1,3 and styrene extended with petroleum based rubber processing oil, calculated excluding said oil.

C. From 20 to 60 parts by weight of a rubbery polymer of cis-1,4 polybutadiene.

It is understood that A+B+C shall equal 100 parts by weight of rubber hydrocarbon. The 20 to 50 parts of rubbery copolymer of butadiene-1,3 and styrene refers to the rubber hydrocarbon portion of the oil extended polymer.

The rubbery copolymers of butadiene-1,3 and acrylonitrile that are useful in the practice of the present invention are prepared by the polymerization of a mixture containing at least 55 parts of butadiene-1,3 and not more than 45 parts of acrylonitrile and recovering the resulting rubbery copolymer. In such copolymers the bound acrylonitrile is generally present in an amount of about 25 to 45 parts per 100 parts by weight of the copolymer. Such copolymers are known by a number of names, including Buna N rubber, nitrile rubber, and more recently, NBR.

The rubbery copolymers of butadiene-1,3 and styrene that are useful in the practice of this invention are commonly referred to as SBR or OE-SBR. Such OE-SBR polymers are prepared by conventional polymerization techniques and may contain from 50 to 90 percent or more of butadiene. An oil extended SBR (OE-SBR) usually contains from 10 to 70 parts and preferably from 20 to 50 parts by weight (based on 100 parts by weight of polymer) of a petroleum-based rubber processing oil.

It should be pointed out that the term "OE-SBR" when used to indicate amounts or ratios of the oil extended SBR in rubber blends refers to the amounts or ratios of the rubber hydrocarbon portion, i.e., non-oil portion of the oil extended SBR.

By the term "petroleum-based rubber processing oil" is meant paraffinic, naphthenic aromatic, highly aromatic and very high aromatic processing and extending oils and mixtures thereof. Preferred oils are naphthenic, aromatic and highly aromatic oils and mixtures consisting primarily of naphthenic, aromatic and highly aromatic oils. Specific examples of aromatic oils which may be used are Sundex 1585 and Sundex 85.

The stereospecific spatially oriented cis-1,4 polybutadiene rubbers that are to be employed in the practice of the present invention are polybutadiene rubber having a high percentage of their polymerized monomer units in a cis-1,4 configuration. A polymer having 85 percent or more of its polymerized monomer units combined in a cis-1,4 structure and not more than 15 percent combined and trans-1,4 and/or 1,2 structure as determined by infrared analysis is to be considered as having a high percentage of cis-1,4 configuration. In accordance with the foregoing description it is to be understood that the term "polybutadiene" includes copolymers of butadiene that contain a major proportion of butadiene with a minor proportion of other monomers polymerizable therewith. In these copolymers of butadiene and other monomers it should be understood that the term "high cis-1,4 structure" is intended to indicate that only the polybutadiene portion of such copolymers need to be in a high cis-1,4 structure, that is, 85 percent or more of the polymerized butadiene units in such copolymer are in a cis-1,4 configuration.

The preparation of cis-1,4 polybutadiene rubbers that are to be employed in the practice of this invention has been described in various literature references and patents. One convenient method for preparing these polymers which is merely representative of a number of known methods is through the use of a catalyst composed of trialkylaluminums such as triethyl aluminum or triisobutyl aluminum. The trialkyl aluminums are used in conjunction with titanium tetraiodide as described in Belgian patent 551,851. These particular catalyst systems are sometimes preferred for the reason that higher levels of cis-1,4 content are obtainable through their use. It has been observed that the improvement in the physical properties of cis-1,4 polybutadiene rubbers for use such as tire applications is related to the amount of cis-1,4 content in the polymer employed. Cis-1,4 contents in excess of 90 percent may be achieved through the use of the above described catalyst system. Additional literature references which give further information on methods of producing 1,4 polybutadiene that may be employed in the practice of the present invention are:

(1) "New Controlled-Structure Polymer of Butadiene," by W. W. Crouch, Rubber & Plastic Age, March 1961, pages 276–282.

(2) "1,4-Cis Polybutadiene," Gummi and Asbest vol. 13, page 1026 (1960).

(3) "Compounding Diene Rubber and Testing," by Ward A. Smith and James M. Willis, Rubber Age, vol. 87, No. 5, August 1960.

As has been described above, rubbery compositions composed of SBR and PBD rubber are known to have very effective tread wear rating characteristics. For example, a 50—50 blend of OE-SBR and PBD rubber has a tread wear rating of approximately 150 percent compared to an all oil extended SBR tread wear rating of 100 percent, but a very unsatisfactory coefficient of friction on wet pavements. In order to evaluate the coefficient of friction of various rubber compositions a series of samples was prepared containing different proportions of OE–SBR, NBR and PBD rubber. The sample rubber tread compositions evaluated were prepared in accordance with the following described rubber formulations and cured in accordance with ASTM procedure D 15–55T for 40 minutes at 275° F.

TABLE I

|  | (A) Control 100 OE-SBR | (B) 50/50 OE-SBR/PBD | (C) 35/15/50 OE-SBR/NBR/PBD | (D) 25/25/50 OE-SBR/NBR/PBD |
|---|---|---|---|---|
| Oil extended, SBR, 37.5 parts of oil | 137.50 | 68.75 | 48.13 | 34.38 |
| Cis-1,4 polybutadiene (PBD) |  | 50.00 | 50.00 | 50.00 |
| Nitrile rubber (NBR) |  |  | 15.00 | 25.00 |
| Diaryl-p-phenylene diamine (antioxidant) | 1.00 | 1.00 | 1.00 | 1.00 |
| Wax | 3.00 | 3.00 | 3.00 | 3.00 |
| Stearic acid | 2.00 | 2.00 | 2.00 | 2.00 |
| Naphthenic Extending Oil |  | 20.00 | 20.00 | 20.00 |
| Carbon black (ISAF) | 68.00 | 60.00 | 60.00 | 60.00 |
| Mercaptobenzothiazole | .90 | .80 | .80 | .80 |
| Diphenyl Guanadine | .50 | .70 | .70 | .70 |
| Sulfur | 1.50 | 1.25 | 1.25 | 1.25 |
| Zinc Oxide | 3.00 | 3.00 | 3.00 | 3.00 |

The rubber stocks described in Table I above were evaluated to determine their coefficient of friction on wet concrete. These coefficient of friction tests were conducted in the laboratory at 35 and 70° F. employing a modified Wilkinson Tester. The Wilkinson Tester is described in an article by C. S. Wilkinson, Jr., India Rubber World, vol. 128, No. 4, July 1953. The apparatus was modified by replacing the ice covered surface with concrete and asphalt slabs wet with a thin layer of water. Rubber stocks A, B, C and D are those described in Table I. The coefficient of friction values reported below in Table II are the overall average of readings made at 35 and 70° F. on a number of concrete and asphalt samples. Values are also reported on a comparative basis wherein the coefficient of friction of a 50/50 OE–SBR/PBD stock is assigned an arbitrary rating of 100. The coefficient of friction "k" is the ratio of the sliding force F to the normal Load $$L\left(k=\frac{F}{L}\right)$$

TABLE II

|  | Stock A | Stock B | Stock C | Stock D |
|---|---|---|---|---|
| Average "k" | 0.792 | 0.695 | 0.818 | 0.830 |
| Percent of Stock B | 114.0 | 100.0 | 117.7 | 119.5 |

A consideration of the data presented in Table II will show that the substitution of approximately 15 parts of an NBR rubber for a portion of the OE–SBR rubber in a 50—50 OE–SBR/PBD blend results in a rubber composition having approximately 17 percent improvement in its coefficient of friction and increasing the proportion of NBR rubber imparts still further improvement in the traction characteristics of the rubber composition. The extreme importance of maintaining traction in our modern automotive vehicles makes it apparent that a 15 to 20 percent increase in the coefficient of friction between the tread stock in a pneumatic tire and a wet paved surface represents a very substantial and important advantage to the motorist.

Although this invention has been described in terms of employing from 10 to 30 parts of a rubbery copolymer of butadiene-1,3 and acrylonitrile, preferred proportions are in the range of from 15 to 20 parts of NBR rubber replacing an equivalent proportion of OE–SBR in a 50—50 OE/SBR/PBD blend.

In severe winter driving conditions which are commonly encountered through large portions of the country the ability of an automobile tire to adhere well to ice and snow surfaces is of primary importance in the safety of an automobile's operation. In order to evaluate the ability of rubber compositions of this invention to adhere to ice, the rubber stocks described in Table I were tested for traction on ice at +20° F. employing the Wilkinson Tester referred to above. The values observed under these test conditions are shown in the following table:

TABLE III

|  | Stock A | Stock B | Stock C | Stock D |
|---|---|---|---|---|
| Average "k" | 0.059 | 0.135 | 0.140 | 0.148 |
| Percent of Stock A | 100.0 | 230.0 | 240.0 | 252.0 |

A consideration of the above data will make it apparent that a tread composition prepared in accordance with the present invention is approximately two and one-half times as effective in obtaining good traction on ice as is a tread prepared from 100 percent oil extended SBR. This very remarkable improvement in traction on an icy surface is obviously of extreme importance in the safety of motor vehicle operation.

In order to further evaluate the coefficient of friction of rubber stocks prepared in accordance with the present invention, sets of test tires were built on standard 7.50 x 14 carcasses and employing in the treads the various rubber compositions described in Table I. These test tires were then mounted on the rear of a test car that was driven on a wet asphalt track at a carefully controlled gradually increasing speed. The relative coefficient of friction of the differnt tread compositions are shown in the following table wherein a 50/50 OE–SBR–PBD blend Composition B of Table I was rated 100.0.

TABLE IV

|  | Stock B | Stock C | Stock D |
|---|---|---|---|
| Relative coefficient of friction | 100.0 | 111.0 | 115.5 |

While certain representative embodiments and details have been shown for the purpose of illustrating the invention it will be apparent to those skilled in this art that various changes and modifications may be made therein without departing from the spirit or scope of the invention.

What I claim is:
1. A rubbery composition having the following proportions:

A. From 10 to 30 parts by weight of a rubbery copolymer of butadine-1,3 and acrylonitrile;

B. From 20 to 50 parts by weight of a rubbery copolymer of butadiene-1,3 and styrene extended with petroleum based rubber processing oil, calculated excluding said oil;
C. From 20 to 60 parts by weight of a rubbery polymer of cis-1,4 polybutadiene;

wherein A+B+C shall equal 100 parts by weight of rubber hydrocarbon.

2. A rubber composition having the following proportions:
A. 15 parts by weight of a rubbery copolymer of butadiene-1,3 and acrylonitrile;
B. 35 parts by weight of a rubbery copolymer of butadiene-1,3 and styrene extended with petroleum based rubber processing oil, calculated excluding said oil;
C. 50 parts by weight of a rubbery polymer of cis-1,4 polybutadiene.

3. A rubber composition having the following proportions:
A. 25 parts by weight of a rubbery copolymer of butadiene-1,3 and acrylonitrile;
B. 25 parts by weight of a rubbery copolymer of butadiene-1,3 and styrene extended with petroleum based rubber processing oil, calculated excluding said oil;
C. 50 parts by weight of a rubbery polymer of cis-1,4 polybutadiene.

4. A pneumatic tire tread composition having the following proportions:
A. From 10 to 30 parts by weight of a rubbery copolymer of butadiene-1,3 and acrylonitrile;
B. From 20 to 50 parts by weight of a rubbery copolymer of butadiene-1,3 and styrene extended with petroleum based rubber processing oil, calculated excluding said oil;
C. From 20 to 60 parts by weight of a rubbery polymer of cis-1,4 polybutadiene;

wherein A+B+C shall equal 100 parts by weight of rubber hydrocarbon.

5. A tire the tread portion of which contains a rubbery composition having the following proportions:
A. From 10 to 30 parts by weight of a rubbery copolymer of butadiene-1,3 and acrylonitrile;
B. From 20 to 50 parts by weight of a rubbery copolymer of butadiene-1,3 and styrene extended with petroleum based rubber processing oil, calculated excluding said oil;
C. From 20 to 60 parts by weight of a rubbery polymer of cis-1,4 polybutadiene;

wherein A+B+C shall equal 100 parts by weight of rubber hydrocarbon.

References Cited by the Examiner

UNITED STATES PATENTS 2,980,569   4/1961   Wening _____ 260—894

OTHER REFERENCES

Brown et al.: Rubber World, November 1961, pp. 70–75.

MORRIS LIEBMAN, *Primary Examiner.*

J. S. WALDRON, *Assistant Examiner.*